United States Patent
Fujiwara

(10) Patent No.: US 7,324,358 B2
(45) Date of Patent: Jan. 29, 2008

(54) POWER SUPPLY APPARATUS INCLUDING CHARGE-PUMP TYPE STEP-UP CIRCUIT OPERATED AT CLOCK SIGNAL FREQUENCY

(75) Inventor: Hirofumi Fujiwara, Shiga (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 11/566,154

(22) Filed: Dec. 1, 2006

(65) Prior Publication Data

US 2007/0127277 A1    Jun. 7, 2007

(30) Foreign Application Priority Data

Dec. 2, 2005   (JP) .............................. 2005-349368

(51) Int. Cl.
  *H02M 3/06* (2006.01)
  *G05F 1/62* (2006.01)
(52) U.S. Cl. ........................ 363/60; 327/536
(58) Field of Classification Search .................. 363/59, 363/60; 327/536
See application file for complete search history.

(56) References Cited

U.S. PATENT DOCUMENTS

| | | | | |
|---|---|---|---|---|
| 6,456,153 B2 * | 9/2002 | Buck et al. | ................. | 327/536 |
| 6,476,665 B2 * | 11/2002 | Buchschacher | ............. | 327/536 |
| 6,791,212 B2 * | 9/2004 | Pulvirenti et al. | .......... | 307/113 |
| 7,253,676 B2 * | 8/2007 | Fukuda et al. | ............... | 327/536 |

FOREIGN PATENT DOCUMENTS

| | | |
|---|---|---|
| JP | 11-018419 A | 1/1999 |
| JP | 2005-020971 A | 1/2005 |

* cited by examiner

*Primary Examiner*—Gary L Laxton
(74) *Attorney, Agent, or Firm*—Sughrue Mion Pllc.

(57) ABSTRACT

In a power supply apparatus including a charge-pump type step-up circuit adapted to carry out a stand-by operation to charge a step-up capacitor by a power supply voltage, and carry out a step-up operation to step up a charged voltage of the step-up capacitor and discharge a stepped-up charged voltage of the step-up capacitor to a smoothing capacitor, the step-up operation is controlled by a clock signal and an AND logic signal between the clock signal and a negative feedback control signal of an output voltage of the charge-pump type step-up circuit. The negative feedback control signal is a pulse width modulation signal so that a frequency of the AND logic signal is always the same as that of the clock signal.

21 Claims, 9 Drawing Sheets

POWER SUPPLY APPARATUS INCLUDING CHARGE-PUMP TYPE STEP-UP CIRCUIT OPERATED AT CLOCK SIGNAL FREQUENCY

BACKGROUND OF THE INVENTION

1. Field of the Invention

The present invention relates to a power supply apparatus including a charge-pump type step-up circuit where the output voltage is regulated in accordance with its negative feedback.

2. Description of the Related Art

A typical power supply apparatus suitably used in a driver for driving a display panel such as a liquid crystal display (LCD) panel of a mobile phone or a personal digital assistant (PDA) includes a charge-pump type step-up circuit and a regulator for regulating the output voltage of the charge-pump type step-up circuit.

A prior art power supply apparatus is constructed by a charge-pump type step-up circuit, and a regulator formed by a voltage divider for dividing the output voltage of the step-up circuit to generate a divided voltage, a comparator for comparing the divided voltage with a reference voltage corresponding to a target voltage of the output voltage to generate a comparison output signal, and an AND circuit for supplying a clock signal to the step-up circuit in accordance with the comparison output signal (see: JP-2005-20971 A). This will be explained later in detail.

SUMMARY OF THE INVENTION

In the above-described prior art power supply apparatus, when a driven load is relatively large, there is no problem. However, when the driven load is relatively small, high frequency noise at indefinite frequencies may be generated from the switches of the charge-pump type step-up circuit, resulting in an erroneous operation of neighbor logic circuits of the power supply apparatus. In this case, if the load is so small that a load current is almost zero, more noise would be generated. Also, if the response characteristics of the comparator are relatively low, the ripple of the output voltage would be increased and its frequency is indefinite.

According to the present invention, in a power supply apparatus including a charge-pump type step-up circuit adapted to carry out a stand-by operation to charge a step-up capacitor by a power supply voltage, and carry out a step-up operation to step up a charged voltage of the step-up capacitor and discharge a stepped-up charged voltage of the step-up capacitor to a smoothing capacitor, the step-up operation is controlled by a clock signal and an AND logic signal between the clock signal and a negative feedback control signal of an output voltage of the charge-pump type step-up circuit. The negative feedback control signal is a pulse width modulation (PWM) signal so that a frequency of the AND logic signal is always the same as that of the clock signal.

Thus, the switches of the charge-pump type step-up circuit are controlled by the frequency of the clock signal, which would not generate high frequency noise at indefinite frequencies. Also, the ripple of the output voltage would be decreased and its frequency is definite.

Note that JP-11-18419 A discloses a chopper-type power supply apparatus where a PWM control with no dead time control (DTC) is used.

BRIEF DESCRIPTION OF THE DRAWINGS

The present invention will be more clearly understood from the description set forth below, as compared with the prior art, with reference to the accompanying drawings, wherein.

DESCRIPTION OF THE PREFERRED EMBODIMENTS

Figure 3:
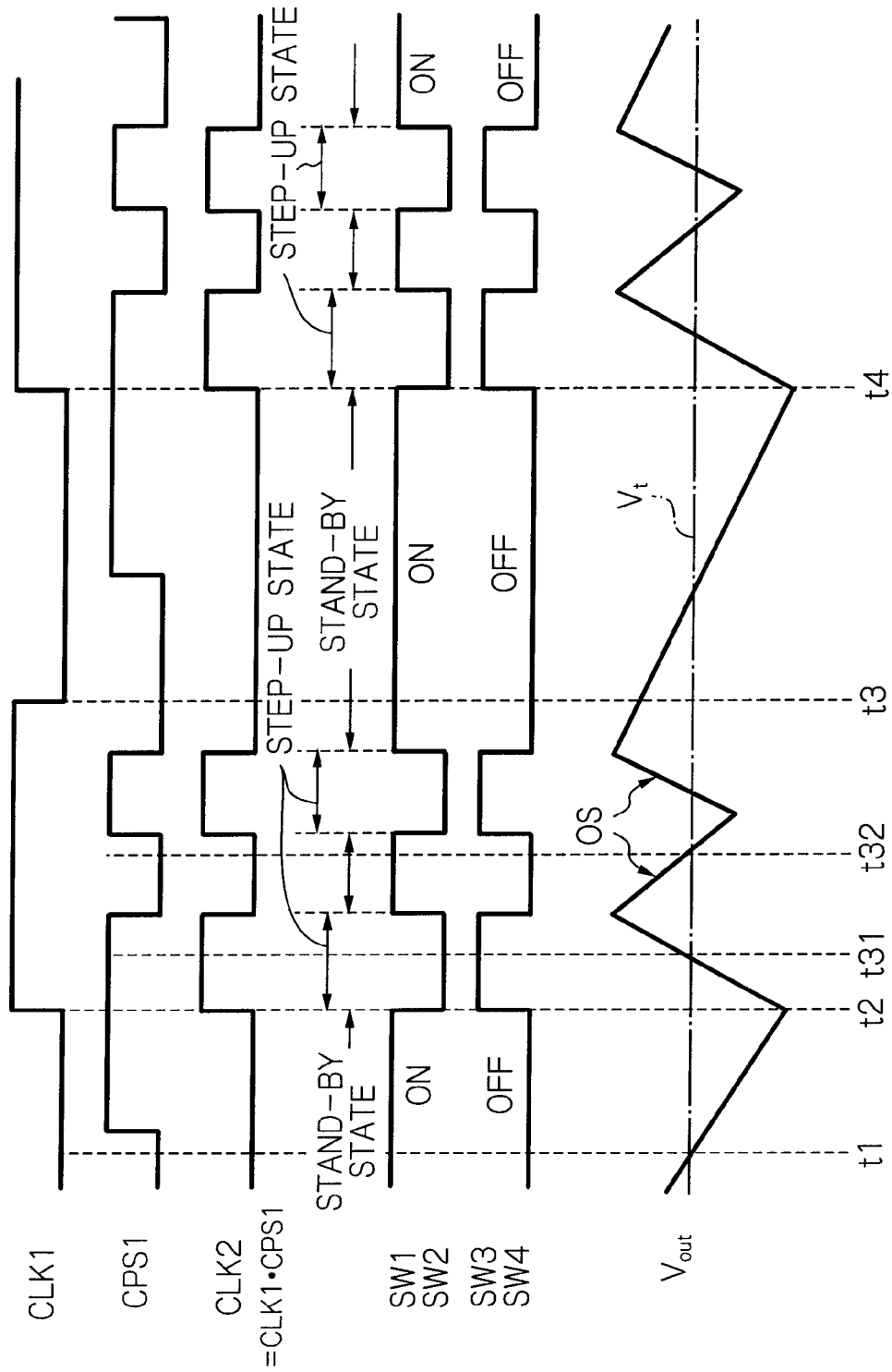
Figure 4:
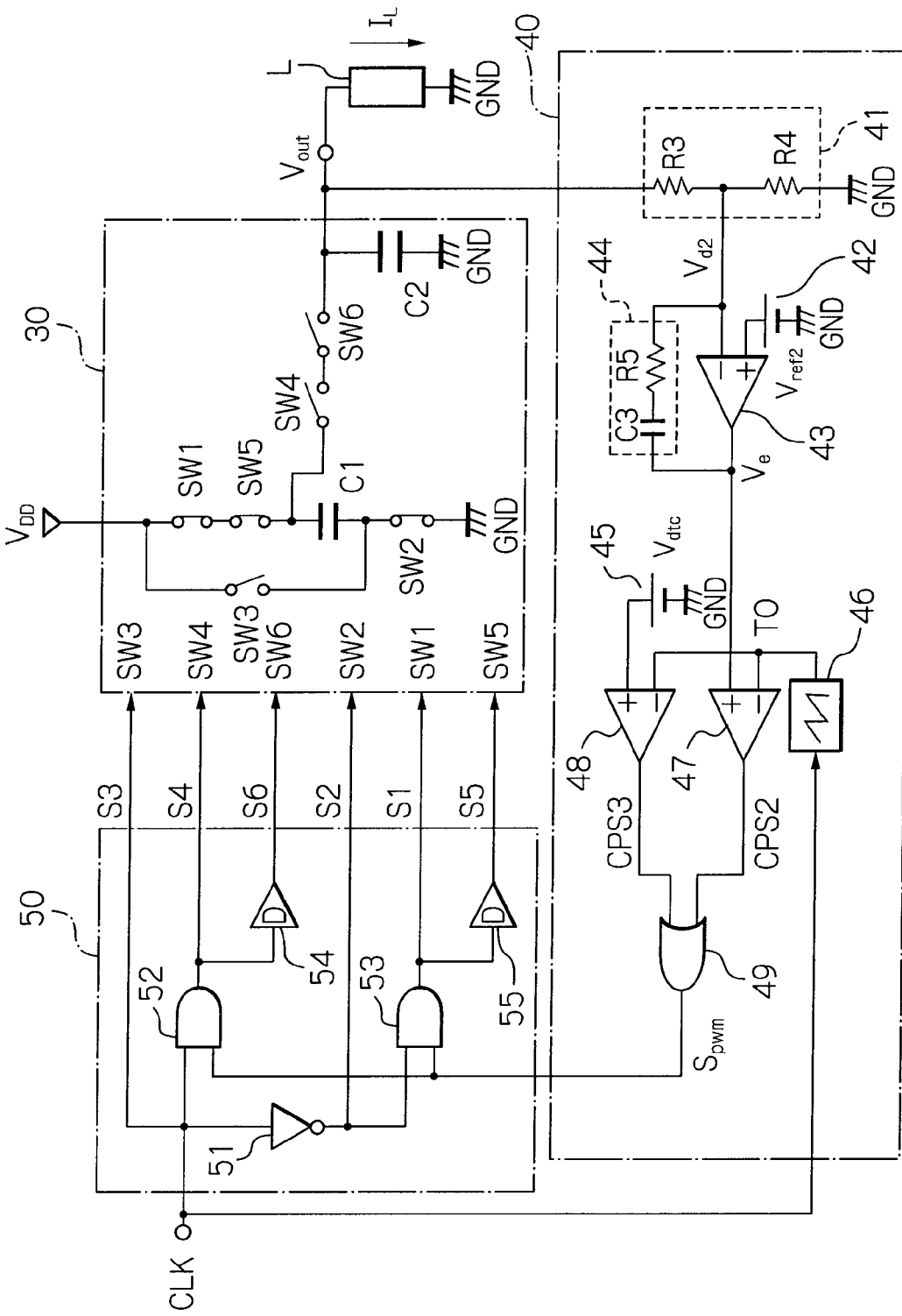
FIG. 4 is a circuit diagram illustrating a first embodiment of the power supply apparatus according to the present invention.
Figure 5:
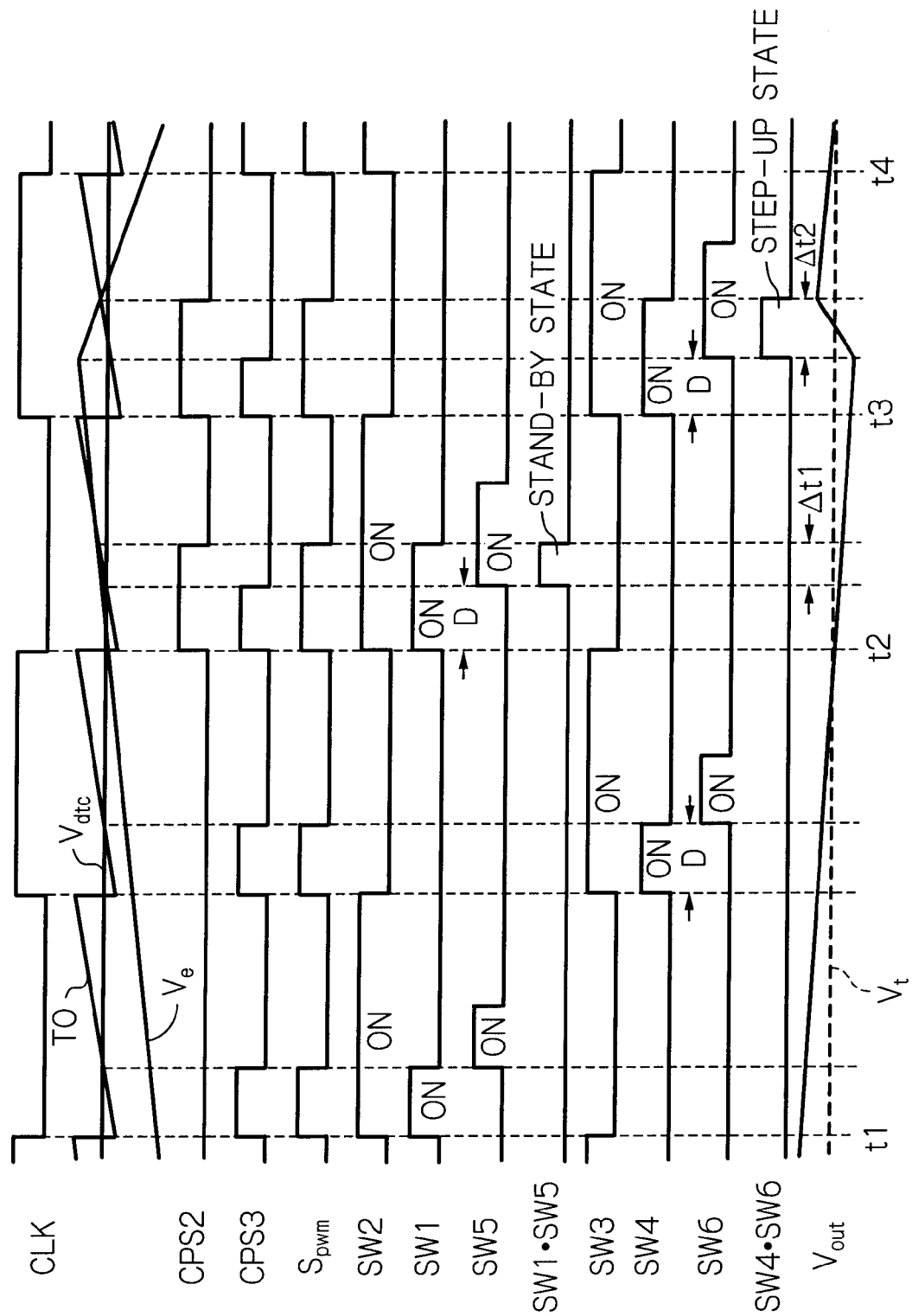
FIGS. 5 and 6 are timing diagrams for explaining the operation of the power supply apparatus of FIG. 4.

Before the description of the preferred embodiments, a prior art power supply apparatus will be explained with reference to FIGS. 1 and 2 (see: FIGS. 3, 4 and 5 of JP-2005-20971 A).

Figure 1:
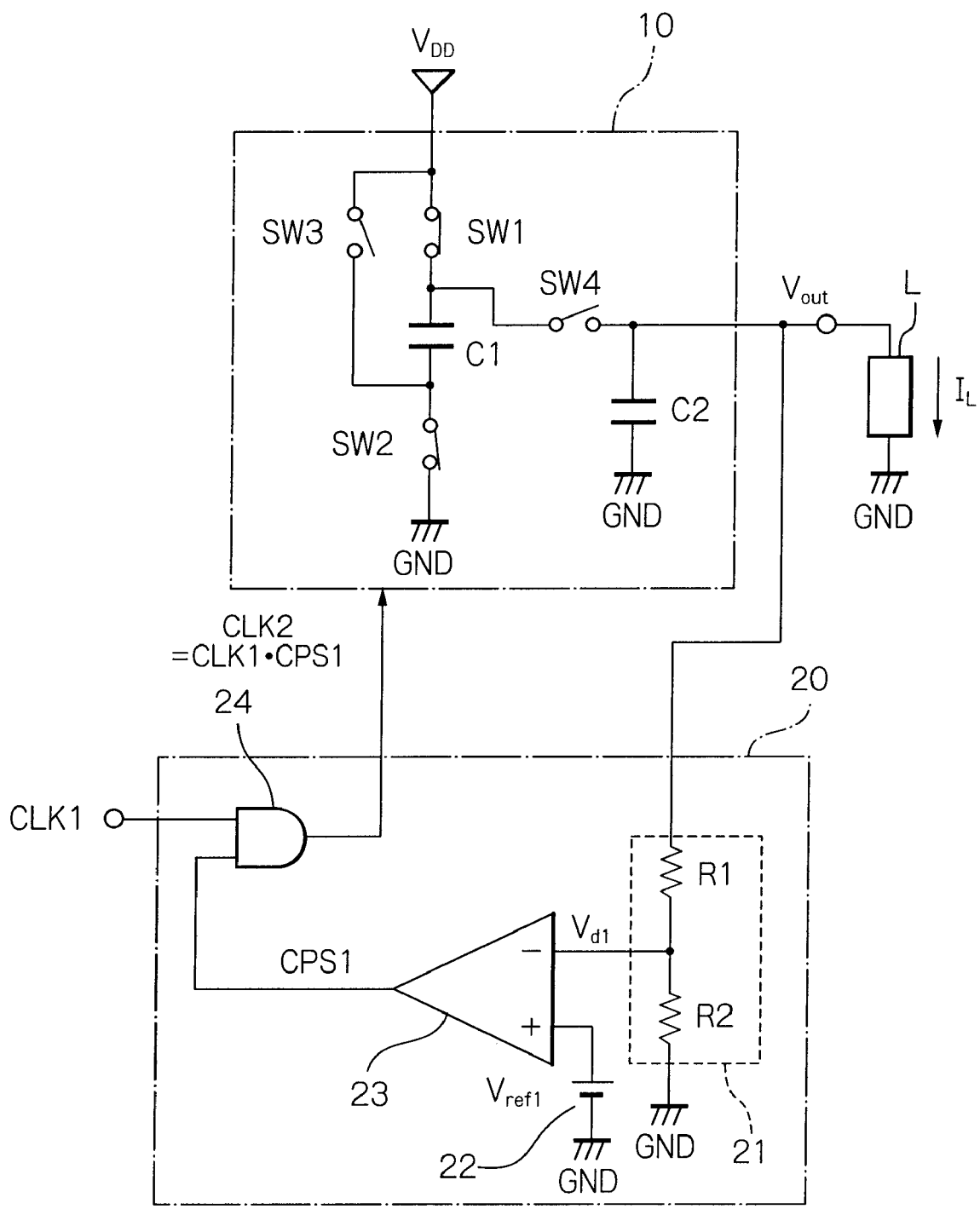
FIG. 1 is a circuit diagram illustrating a prior art power supply apparatus.

In FIG. 1, a prior art power supply apparatus is constructed by a step-up circuit 10 for stepping up a power supply voltage $V_{DD}$ as an input voltage in accordance with a skipped clock signal CLK2 of a clock signal CLK1 to generate a stepped-up voltage, i.e., an output voltage $V_{out}$, and a regulator 20 for regulating the output voltage $V_{out}$ of the step-up circuit 10 to a target voltage $V_t$. In this case, the regulator 20 skips the clock signal CLK1 in accordance with the output voltage $V_{out}$ of the step-up circuit 10 to generate the clock signal CLK2 and transmit it to the step-up circuit 10.

The charge pump circuit 10 is constructed by four switches SW1, SW2, SW3 and SW4, a step-up capacitor C1 and a smoothing capacitor C2. In this case, the set of the switches SW1 and SW2 as charging switching elements and the set of the switches SW3 and SW4 as discharging switching elements are complimentarily turned ON and OFF by the clock signal CLK2. That is, in a stand-by state where CLK2="0" (low level), the switches SW1 and SW2 are turned ON while the switches SW3 and SW4 are turned OFF, so that the step-up capacitor C1 is charged by a power supply voltage $V_{DD}$. On the other hand, in a step-up state where CLK2="1" (high level), the switches SW1 and SW2 are turned OFF while the switches SW3 and SW4 are turned ON, so that the power supply voltage $V_{DD}$ is superposed onto the charged voltage of the step-up capacitor C1. Thus, the stand-by state and the step-up state are alternately repeated, so that a voltage at the smoothing capacitor C2, i.e., the output voltage $V_{out}$ becomes higher than the power supply voltage $V_{DD}$.

If duration periods of the stand-by state and the step-up state are long enough to charge the step-up capacitor C1 and the smoothing capacitor C2, respectively, at their saturation states, the output voltage $V_{out}$ of the step-up circuit 10 would become a voltage of $2 \cdot V_{DD}$. Conversely, if the duration period of the stand-by state and the step-up state is insufficient to charge the step-up capacitor C1 and the smoothing capacitor C2, respectively, at their non-saturation states, the output voltage $V_{out}$ of the step-up circuit 10 would become smaller than $2 \cdot V_{DD}$. That is, the regulator 20 is provided to make the output voltage $V_{out}$ of the step-up circuit 10 to be a target voltage $V_t$ which satisfies the following:

$$V_t \leq 2 \cdot V_{DD}$$

The regulator 20 is constructed by a voltage divider 21 for generating a divided voltage $V_{d1}$ of the output voltage $V_{out}$ of the step-up circuit 10, a reference voltage source 22 formed by a band gap regulator or the like for generating a reference voltage $V_{ref1}$ corresponding to the target voltage $V_t$, a comparator 23 for comparing the divided voltage $V_{d1}$ of the voltage divider 21 with the reference voltage $V_{ref1}$ to generate a comparison output signal CPS1, and an AND circuit 24 for passing a clock signal CLK1 therethrough as the clock signal CLK2 in accordance with the comparison output signal CPS1. That is, $$CLK2 = CLK1 \cdot CPS1$$

Also, the divided voltage $V_{d1}$ is represented by $$V_{d1} = V_{out} R2/(R1+R2)$$

where R1 and R2 represent the resistance values of the resistors R1 and R2, respectively.

Therefore, the regulator 20 regulates the output voltage $V_{out}$ of the step-up circuit 10 so that the output voltage $V_{out}$ is brought close to the target voltage $V_t$ represented by $$V_t = V_{ref1} \cdot (R1+R2)/R2 \leq 2 \cdot V_{DD}$$

Thus, the target voltage $V_t$ can be set by adjusting one or more of the reference voltage $V_{ref1}$ and the resistors R1 and R2.

In other words, the comparator 23 substantially compares the output voltage $V_{out}$ of the step-up circuit 10 with the target voltage $V_t$ to generate the comparison output signal CPS1. That is, if $V_{out} \leq V_t$, CPS1="1" (high level). On the other hand, if $V_{out} \geq V_t$, CPS1="0" (low level).

A first operation of the power supply apparatus of FIG. 1 is explained next with reference to FIG. 2 where a load L to which the output voltage $V_{out}$ is applied is relatively small and the response characteristics of the comparator 23 are relatively high.

First, at time t1, the clock signal CLK1 is low so that the clock signal CLK2 is also low. Therefore, the step-up circuit 10 is in a stand-by state where the switches SW1 and SW2 are turned ON and the switches SW3 and SW4 are turned OFF.

Next, at time t2, since $V_{out} < V_t$, the comparison output signal CPS1 of the comparator 23 is "1" (high level), so that CLK2=CLK1. Therefore, when the clock signal CLK1 is switched from "0" (low level) to "1" (high level), so that the clock signal CLK2 (=CLK1·CPS1) is also switched from "0" (low level) to "1" (high level), the step-up circuit 10 enters a step-up state where the switches SW1 and SW2 are turned OFF and the switches SW3 and SW4 are turned ON. As a result, the output voltage $V_{out}$ of the step-up circuit 10 approaches the target voltage $V_t$. In this case, however, since the load L is relatively small, the output voltage $V_{out}$ would quickly reach the target voltage $V_t$ at times t21, t22, . . . . In addition, since the response characteristics of the comparator 23 are relatively high, the comparison output signal CPS1 of the comparator 23 would be quickly reversed. Therefore, step-up states and stand-by states are alternately and quickly repeated until time t3 when the clock signal CLK1 becomes "0" (low level).

Next, at time t3, when the clock signal CLK1 is switched from "1" (high level) to "0" (low level), the clock signal CLK2 is also switched from "1" (high level) to "0" (low level). Therefore, the step-up circuit 10 enters another stand-by state.

After time t4, similar step-up/stand-by states to those from time t2 to time t3 and a similar stand-by state to that from time t3 to time t4 are alternately repeated.

Figure 2:
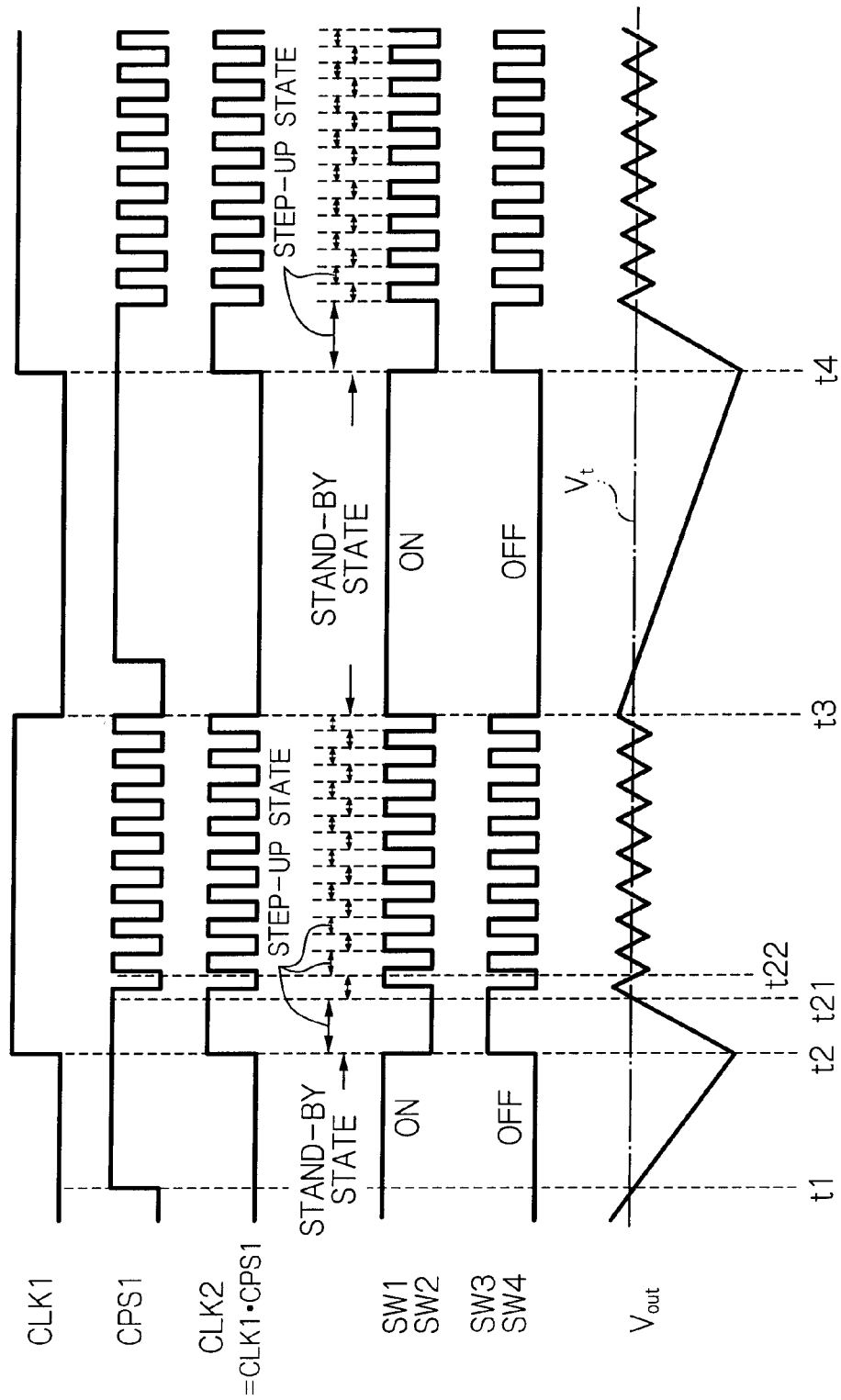
FIGS. 2 and 3 are timing diagrams for explaining the operation of the power supply apparatus of FIG. 1.

In the first operation as shown in FIG. 2, however, since the clock signal CLK2 repeats "0" (low level) and "1" (high level) very frequently when the clock signal CLK1 is "1" (high level), the frequency of the clock signal CLK2 for operating the switches SW1, SW2, SW3 and SW4 is higher than that of the clock signal CLK1, so that high frequency noise at indefinite frequencies may be generated from the switches SW1, SW2, SW3 and SW4, resulting in an erroneous operation of neighbor logic circuits of the power supply apparatus. Also, the ripple of the output voltage $V_{out}$ would be increased. In this case, if the load L is so small that a load current $I_L$ is almost zero, the frequency of the clock signal CLK2 is much higher than that of the clock signal CLK1, which would generate more noise.

A second operation of the power supply apparatus of FIG. 1 is explained next with reference to FIG. 3 where the load L to which the output voltage $V_{out}$ is applied is relatively small and the response characteristics of the comparator 23 are relatively low.

First, at time t1, the clock signal CLK1 is low so that the clock signal CLK2 is also low. Therefore, the step-up circuit 10 is in a stand-by state where the switches SW1 and SW2 are turned ON and the switches SW3 and SW4 are turned OFF.

Next, at time t2, since $V_{out} < V_t$, the comparison output signal CPS1 of the comparator 23 is "1" (high level), so that CLK2=CLK1. Therefore, when the clock signal CLK1 is switched from "0" (low level) to "1" (high level), so that the clock signal CLK2 (=CLK1·CPS1) is also switched from "0" (low level) to "1" (high level), the step-up circuit 10 enters a step-up state where the switches SW1 and SW2 are turned OFF and the switches SW3 and SW4 are turned ON. As a result, the output voltage $V_{out}$ of the step-up circuit 10 approaches the target voltage $V_t$. In this case, however, since the load L is relatively small, the output voltage $V_{out}$ would quickly reach the target voltage $V_t$ at times t31, t32, . . . . On the other hand, since the response characteristics of the comparator 23 are relatively low, the comparison output signal CPS1 of the comparator 23 would be slowly reversed. Therefore, step-up states and stand-by states are alternately and slowly repeated to have a large amplitude output voltage until time t3 when the clock signal CLK1 becomes "0" (low level).

Next, at time t3, when the clock signal CLK1 is switched from "1" (high level) to "0" (low level), the clock signal CLK2 is also switched from "1" (high level) to "0" (low level). Therefore, the step-up circuit 10 enters another stand-by state.

After time t4, similar step-up/stand-by states to those from time t2 to time t3 and a similar stand-by state to that from time t3 to time t4 are alternately repeated.

In the second operation as shown in FIG. 3, however, a time period from time t31 to time t32 or the like is large enough to generate large overshoots OS, which would remarkably increase the output voltage $V_{out}$ of the step-up circuit 10. At worst, when the output voltage $V_{out}$ exceeds a rated value, the elements within the power supply apparatus of FIG. 1 would deteriorate. Simultaneously, in the same way as in FIG. 2, the frequency of the clock signal CLK2 for operating the switches SW1, SW2, SW3 and SW4 is higher than that of the clock signal CLK1, so that high frequency noise at indefinite frequencies may be generated from the switches SW1, SW2, SW3 and SW4, resulting in an erroneous operation of neighbor logic circuits of the power supply apparatus. Also, the ripple of the output voltage $V_{out}$ would be increased. Even in this case, if the load L is so small that the load current $I_L$ is almost zero, the frequency of the clock signal CLK2 is much higher than that of the clock signal CLK1, which would generate more noise.

In the operations as shown in FIGS. 2 and 3, the ripple of the output voltage $V_{out}$ would be generated at indefinite frequencies. For example, if the power supply apparatus of FIG. 1 is applied to a series regulator having a frequency band to decrease a power supply voltage removal ratio (SVRR), some of indefinite frequencies of the ripple of the output voltage $V_{out}$ would fall within the above-mentioned frequency band. Therefore, it is preferable that the frequencies of the ripple of the output voltage $V_{out}$ should be definite.

In FIG. 4, which illustrates a first embodiment of the power supply apparatus according to the present invention, the step-up circuit 10 of FIG. 1 is changed to a step-up circuit 30. Also, a pulse width modulation (PWM) control circuit 40 for generating a PWM signal $S_{pwm}$ and a step-up control circuit 50 for controlling the step-up circuit 30 by using a clock signal CLK and the PWM signal $S_{pwm}$ are provided instead of the regulator 20 of FIG. 1.

The step-up circuit 30 includes switches SW5 and SW6 in addition to the elements of the step-up circuit 10 of FIG. 1. The switch SW5 is connected in series to the switch SW1, and the switch SW6 is connected in series to the switch SW4.

The PWM control circuit 40 is constructed by a voltage divider 41, a reference voltage source 42 formed by a band gap regulator or the like, an error amplifier 43, a phase compensating circuit 44, a dead time control (DTC) voltage generating circuit 45, a saw-tooth wave signal generating circuit 46, comparators 47 and 48, and an OR circuit 49.

The voltage divider 41 is constructed by resistors R3 and R4 to generate a divided voltage $V_{d2}$ of the output voltage $V_{out}$ of the step-up circuit 30 represented by $$V_{d2}=V_{out} \cdot R3/(R3+R4)$$

where R3 and R4 represent the resistance values of the resistors R3 and R4, respectively. The divided voltage $V_{d2}$ is supplied to an inverting input of the error amplifier 43.

A reference voltage $V_{ref2}$ generated from the reference voltage source 42 is supplied to a non-inverting input of the error amplifier 43. Also, the phase compensating circuit 44 formed by a series of a resistor R5 and a capacitor C3 is connected between the inverting input and an output of the error amplifier 43 to control the gain of a negative feedback control of the output voltage $V_{out}$, thus avoiding the oscillation and obtaining a phase margin. As a result, the error amplifier 43 amplifies a difference between the divided voltage $V_{d2}$ and the reference voltage $V_{ref2}$ to generate an error voltage $V_e$ which is supplied to a non-inverting of the comparator 47. Note that the reference voltage $V_{ref2}$ corresponds to a target voltage $V_t$ of the output voltage $V_{out}$.

The DTC voltage generating circuit 45 generates a DTC voltage $V_{dtc}$ for defining a minimum pulse width (minimum ON-duty duration) of the PWM signal $S_{pwm}$. The DTC voltage $V_{dtc}$ is supplied to a non-inverting input of the comparator 48.

The saw-tooth wave signal generating circuit 46 receives a clock signal CLK1 to generate a saw-tooth wave signal T0 having half the period of the clock signal CLK. The saw-tooth wave signal T0 is supplied to inverting inputs of the comparators 47 and 48.

The comparator 47 compares the error voltage $V_e$ with the saw-tooth wave signal T0 to generate a comparison output signal CPS2. When $V_e > T0$, the comparison output signal CPS2 is "1" (high level). On the other hand, when $V_e \leq T0$, the comparison output signal CPS2 is "0" (low level).

The comparator 48 compares the DTC voltage $V_{dtc}$ with the saw-tooth wave signal T0 to generate a comparison output signal CPS3. When $V_{dtc} > T0$, the comparison output signal CPS3 is "1" (high level). On the other hand, when $V_{dtc} \leq T0$, the comparison output signal CPS3 is "0" (low level).

The comparison output signal CPS2 and CPS3 of the comparators 47 and 48 are outputted as the PWM signal $S_{pwm}$ by the OR circuit 49.

Thus, by the comparators 47 and 48 and the OR circuit 49 of the PWM control circuit 40, the saw-tooth wave signal T0 is compared with a higher one $V_h$ of the error voltage $V_e$ and the DTC voltage $V_{dtc}$. As a result, when $T0 < V_h$, the PWM signal $S_{pwm}$ is "1" (high level). On the other hand, when $T0 \geq V_h$, the PWM signal $S_{pwm}$ is "0" (low level). Therefore, when $V_e > V_{dtc}$, the pulse width of the PWM signal $S_{pwm}$ is dependent upon the output signal $V_{out}$. On the other hand, when $V_e \leq V_{dtc}$, the pulse width of the PWM signal $S_{pwm}$ is the minimum ON-duty duration.

The step-up control circuit 50 is constructed by an inverter 51, AND circuits 52 and 53, and delay buffers 54 and 55.

The clock signal CLK is supplied as a control signal S3 directly to the switch SW3 of the step-up circuit 30, while the inverted signal of the clock signal CLK by the inverter 51 is supplied as a control signal S2 to the switch SW2 of the step-up circuit 30.

An AND logic signal of the clock signal CLK and the PWM signal $S_{pwm}$ by the AND circuit 52 is supplied as a control signal S4 to the switch SW4 of the step-up circuit 30. Also, a delayed signal of the control signal S4 by the delay buffer 54 is supplied as a control signal S6 to the switch SW6 of the step-up circuit 30.

An AND logic signal of the inverted signal of the clock signal CLK by the inverter 51 and the PWM signal $S_{pwm}$ by the AND circuit 53 is supplied as a control signal S1 to the switch SW1 of the step-up circuit 30. Also, a delayed signal of the control signal S1 by the delay buffer 55 is supplied as a control signal S5 to the switch SW5 of the step-up circuit 30.

The delay time D of the delay buffers 54 and 55 is set to be a predetermined time period, so that the control signal S4 is not superposed on the control signal S6 and also, the control signal S1 is not superposed onto the control signal S5 when the PWM signal $S_{pwm}$ is the minimum ON-duty duration. For example, the above-mentioned delay time D is a time period corresponding to the minimum ON-duty duration.

A first operation of the power supply apparatus of FIG. 4 is explained next with reference to FIG. 5 where the load L is relatively small.

First, during a time period from time t1 to time t2, the output voltage $V_{out}$ is higher than the target voltage $V_t$, so that the error voltage $V_e$ is lower than the saw-tooth wave signal T0. As a result, the comparison output signal CPS2 of the comparator 47 is low and the comparison output signal CPS3 of the comparator 48 is changed with the minimum ON-duty duration determined by the DTC voltage $V_{dtc}$. Therefore, the PWM signal $S_{pwm}$ is also changed with the minimum ON-duty duration, and also, the switches SW1 and SW5 and the switches SW4 and SW6 are changed with the minimum ON-duty duration. In this case, the switches SW1 and SW5 are not simultaneously turned ON so that no stand-by operations for charging the capacitor C1 are carried out. Similarly, the switches SW4 and SW6 are not simultaneously turned ON so that no step-up operations for discharging the capacitor C1 are carried out. Thus, the output voltage $V_{out}$ is not increased.

Next, during a time period from time t2 to time t3, the output voltage $V_{out}$ is lower than the target voltage $V_t$, so that the error voltage $V_e$ is higher than the saw-tooth wave signal T0 for a certain long time period. As a result, the comparison output signal CPS2 of the comparator 47 is high for that certain time period. On the other hand, the comparison output signal CPS3 of the comparator 48 is changed with the minimum ON-duty duration determined by the DTC voltage $V_{dtc}$. Therefore, the PWM signal $S_{pwm}$ has a duration longer than the minimum ON-duty duration by a time period $\Delta$ t1 where the switches SW2, SW1 and SW5 are simultaneously turned ON to carry out a stand-by operation for charging the capacitor C1.

Next, during a time period from time t3 to time t4, the output voltage $V_{out}$ is still low for the time being, so that the error voltage $V_e$ is still higher than the saw-tooth wave signal T0 for a certain time period. As a result, the comparison output signal CPS2 of the comparator 47 is high for that certain time period. On the other hand, the comparison output signal CPS3 of the comparator 48 is changed with the minimum ON-duty duration determined by the DTC voltage $V_{dtc}$. Therefore, the PWM signal $S_{pwm}$ has a duration longer than the minimum ON-duty duration by a time period $\Delta$ t2 where the switches SW3, SW4 and SW6 are simultaneously turned ON to carry out a step-up operation for discharging the capacitor C1. Thus, the output voltage $V_{out}$ is increased.

In the operation as shown in FIG. 4, the switches SW2, SW1, SW5, SW3, SW4 and SW6 are controlled by the frequency of the clock signal CLK, which would not generate high frequency noise at indefinite frequencies.

Figure 6:
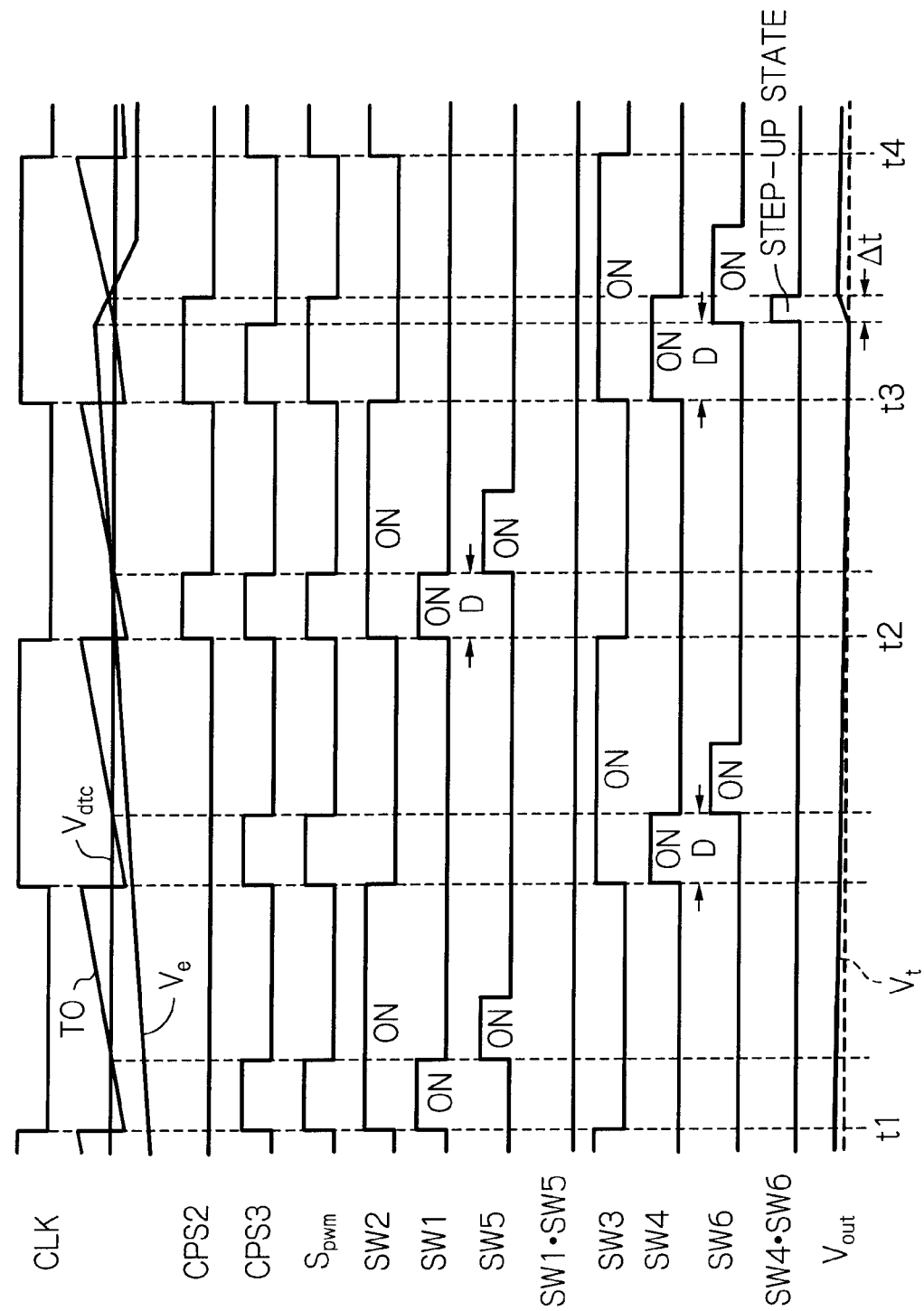

A second operation of the power supply apparatus of FIG. 4 is explained next with reference to FIG. 6 where the load L is very small so that the load current $I_L$ is almost zero.

First, during a time period from time t1 to time t2, the output voltage $V_{out}$ is higher than the target voltage $V_t$, so that the error voltage $V_e$ is lower than the saw-tooth wave signal T0. As a result, the comparison output signal CPS2 of the comparator 47 is low and the comparison output signal CPS3 of the comparator 48 is changed with the minimum ON-duty duration determined by the DTC voltage $V_{dtc}$. Therefore, the PWM signal $S_{pwm}$ is also changed with the minimum ON-duty duration, and also, the switches SW1 and SW5 and the switches SW4 and SW6 are changed with the minimum ON-duty duration. In this case, the switches SW1 and SW5 are not simultaneously turned ON so that no stand-by operations for charging the capacitor C1 are carried out. Similarly, the switches SW4 and SW6 are not simultaneously turned ON so that no step-up operations for discharging the capacitor C1 are carried out. Thus, the output voltage $V_{out}$ is not increased.

Next, during a time period from time t2 to time t3, the output voltage $V_{out}$ is still higher than the target voltage $V_t$, but, the error voltage $V_e$ is higher than the saw-tooth wave signal T0 for a certain short time period. As a result, the comparison output signal CPS2 of the comparator 47 is high for that certain time period. On the other hand, the comparison output signal CPS3 of the comparator 48 is changed with the minimum ON-duty duration determined by the DTC voltage $V_{dtc}$. Therefore, the PWM signal $S_{pwm}$ is changed with the minimum ON-duty duration. As a result, switches SW2, SW1 and SW5 are not simultaneously turned ON so that no stand-by operation for charging the capacitor C1 is carried out.

Next, during a time period from time t3 to time t4, the output voltage $V_{out}$ reaches the target voltage $V_t$, but the error voltage $V_e$ is still higher than the saw-tooth wave signal T0 for a certain time period. As a result, the comparison output signal CPS2 of the comparator 47 is high for that certain time period. On the other hand, the comparison output signal CPS3 of the comparator 48 is changed with the minimum ON-duty duration determined by the DTC voltage $V_{dtc}$. Therefore, the PWM signal $S_{pwm}$ has a duration longer than the minimum ON-duty duration by a time period $\Delta$ t where the switches SW3, SW4 and SW6 are simultaneously turned ON to carry out a step-up operation for discharging the capacitor C1. Thus, the output voltage $V_{out}$ is increased.

Also, in the operation as shown in FIG. 5, the switches SW2, SW1, SW5, SW3, SW4 and SW6 are controlled by the frequency of the clock signal CLK, which would not generate high frequency noise at indefinite frequencies.

In FIGS. 4 and 5, the ripple of the output voltage $V_{out}$ is dependent upon one step-up state of each high period of the clock signal CLK. Therefore, the ripple frequency of the output voltage $V_{out}$ is not indefinite.

Figure 7:
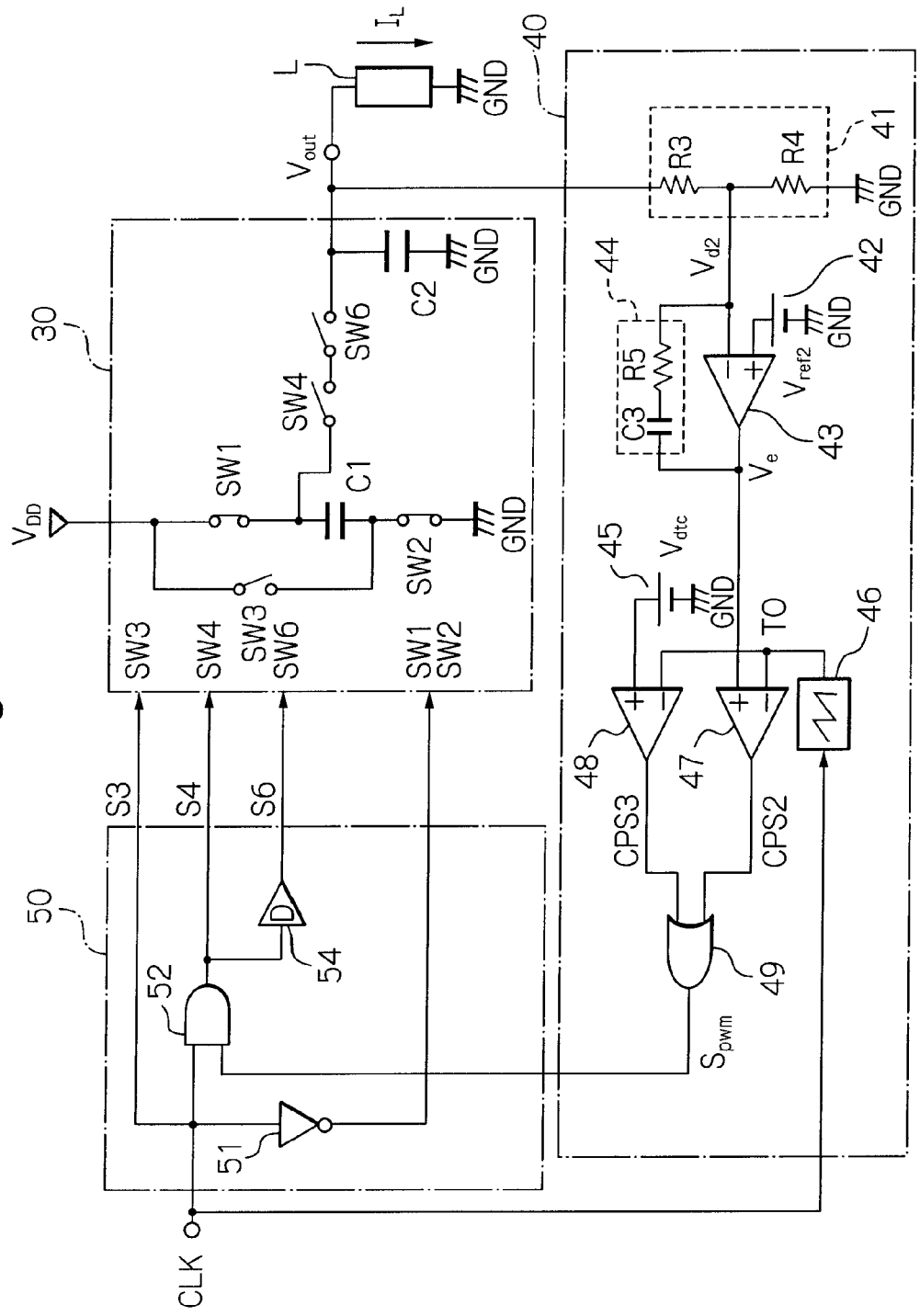
FIG. 7 is a circuit diagram illustrating a second embodiment of the power supply apparatus according to the present invention.
Figure 8:
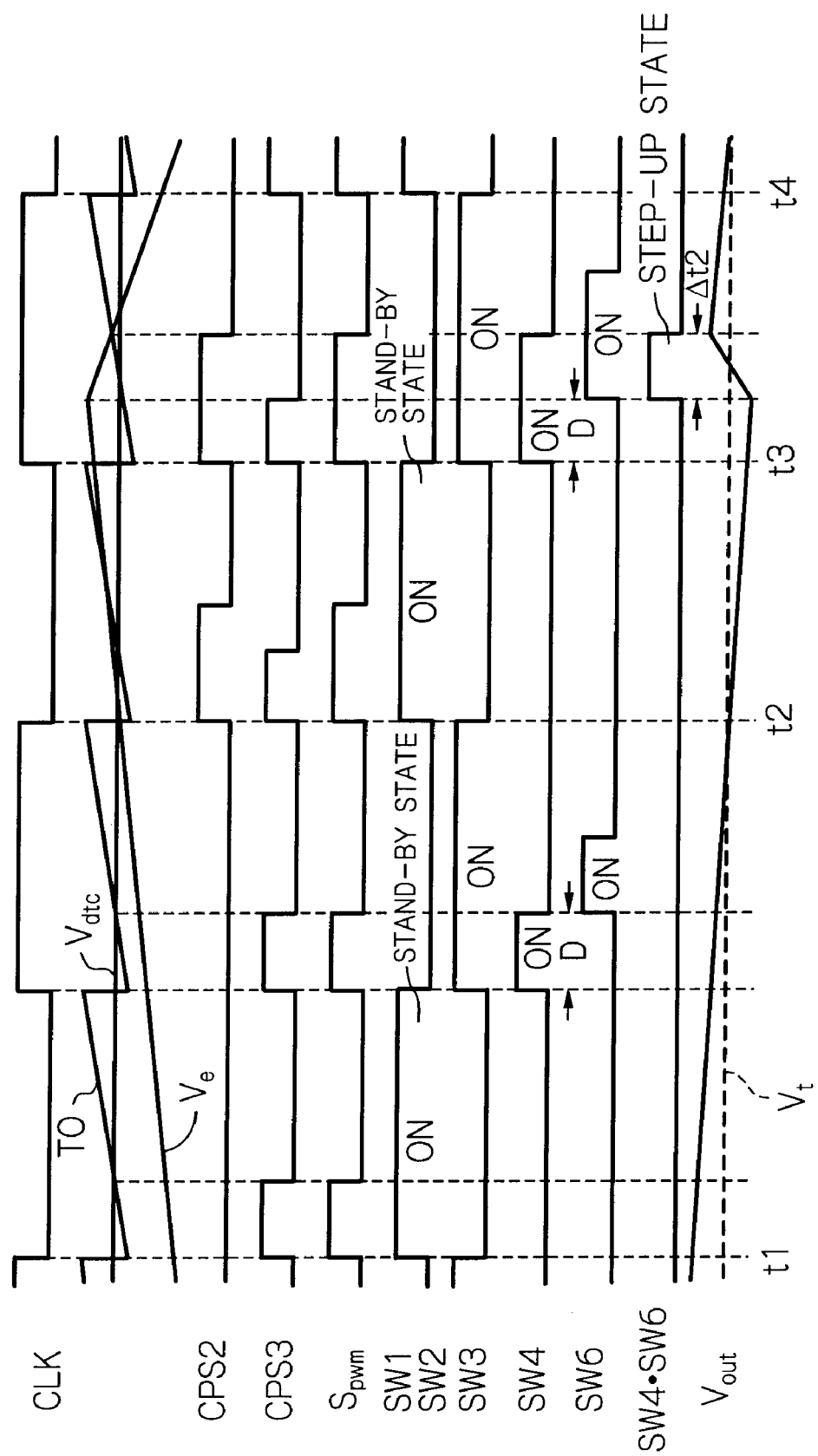
FIGS. 8 and 9 are timing diagrams for explaining the operation of the power supply apparatus of FIG. 7.
Figure 9:
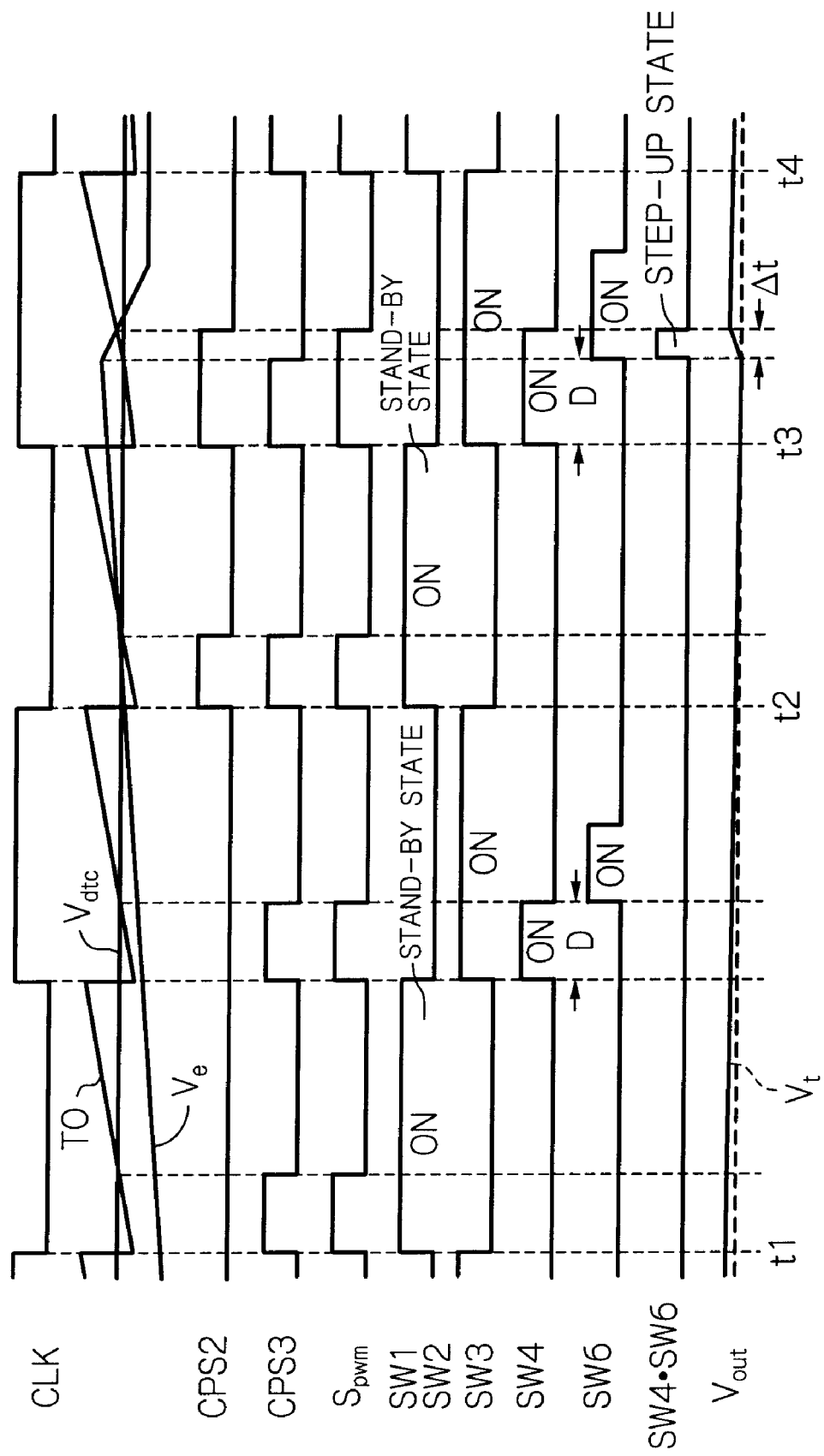

In FIG. 7, which illustrates a second embodiment of the power supply apparatus according to the present invention, the switch SW5 of FIG. 4 is removed from the step-up circuit 30, and the AND circuit 53 and the delay circuit 55 of FIG. 4 is removed from the step-up control circuit 50, so that the switches SW1 and SW2 are commonly controlled by an inverted signal of the clock signal CLK. Therefore, the stand-by operation is the same as that of the power supply apparatus of FIG. 1. That is, even in the power supply apparatus of FIG. 1, since the charge-up operation of the switches SW1 and SW2 generate no noise as shown in FIGS. 2 and 3, the power supply apparatus of FIG. 7 is equivalent to the power supply apparatus of FIG. 4 as shown in FIGS. 8 and 9 corresponding to FIGS. 5 and 6, respectively, in view of the noise.

The invention claimed is:

1. A power supply apparatus comprising a charge-pump type step-up circuit adapted to carry out a stand-by operation to charge a step-up capacitor by a power supply voltage, and carry out a step-up operation to step up a charged voltage of said step-up capacitor and discharge a stepped-up charged voltage of said step-up capacitor to a smoothing capacitor, wherein said step-up operation is controlled by a clock signal and a first AND logic signal between said clock signal and a negative feedback control signal of an output voltage of said charge-pump type step-up circuit, said negative feedback control signal being a pulse width modulation signal so that a frequency of said first AND logic signal is always the same as that of said clock signal.

2. The power supply apparatus as set forth in claim 1, wherein said pulse width modulation signal has a minimum ON duty duration.

3. The power supply apparatus as set forth in claim 2, wherein said charge-pump type step-up circuit comprises first and second switches connected in series in a discharging path between said step-up capacitor and said smoothing capacitor, said first switch being controlled by said first AND logic signal, said second switch being controlled by a delayed signal of said first AND logic signal.

4. The power supply apparatus as set forth in claim 3, wherein, when said pulse width modulation signal has a minimum ON-duty duration, said first and second switches are not simultaneously turned ON.

5. The power supply apparatus as set forth in claim 3, wherein said charge-pump type step-up circuit further comprises a third switch connected between a first power supply terminal for receiving said power supply voltage and said step-up capacitor,
said third switch being controlled by said clock signal.

6. The power supply apparatus as set forth in claim 1, wherein said stand-by operation is controlled by an inverted signal of said clock signal and a second AND logic signal between the inverted signal of said clock signal and said negative feedback control signal of the output voltage of said charge-pump type step-up circuit.

7. The power supply apparatus as set forth in claim 6, wherein said charge-pump type step-up circuit comprises fourth and fifth switches connected in series in a charging path between a first power supply terminal for receiving said power supply voltage and said step-up capacitor,
said fourth switch being controlled by said second AND logic signal,
said fifth switch being controlled by a delayed signal of said second AND logic signal.

8. The power supply apparatus as set forth in claim 7, wherein, when said pulse width modulation signal has a minimum ON-duty duration, said fourth and fifth switches are not simultaneously turned ON.

9. The power supply apparatus as set forth in claim 7, wherein said charge-pump type step-up circuit further comprises a sixth switch connected between said step-up capacitor and a second power supply terminal,
said sixth switch being controlled by an inverted signal of said clock signal.

10. The power supply apparatus as set forth in claim 1, wherein said charge-pump type step-up circuit further comprises:
a fourth switch connected between a first power supply terminal for receiving said power supply voltage and said step-up capacitor; and
a fifth switch connected between said step-up capacitor and a second power supply terminal,
said fourth and second switches being controlled by an inverted signal of said clock signal.

11. A power supply apparatus comprising:
a charge-pump type step-up circuit adapted to carry out a stand-by operation to charge a step-up capacitor by a power supply voltage, and carry out a step-up operation to step up a charged voltage of said step-up capacitor and discharge a stepped-up charged voltage of said step-up capacitor to a smoothing capacitor;
a pulse width modulation control circuit adapted to receive an output voltage of said charge-pump type step-up circuit to generate a pulse width modulation signal in accordance with said output voltage; and
a step-up control circuit adapted to receive a clock signal and said pulse width modulation signal to generate control signals in accordance with said clock signal and said pulse width modulation signal and transmit said control signals to said charge-pump type step-up circuit,
said control signals including said clock signal, an inverted signal of said clock signal and a first AND logic signal between said clock signal and said pulse width modulation signal, so that frequencies of said control signals are always the same as that of said clock signal.

12. The power supply apparatus as set forth in claim 11, wherein said pulse width modulation signal has a minimum ON duty duration.

13. The power supply apparatus as set forth in claim 12, wherein said charge-pump type step-up circuit comprises first and second switches connected in series in a discharging path between said step-up capacitor and said smoothing capacitor, and
wherein said step-up control circuit comprises:
a first AND circuit adapted to receive said clock signal and said pulse width modulation signal to generate said first AND logic signal; and
a first delay buffer adapted to receive said first AND logic signal to generate a delayed signal of said first AND logic signal.

14. The power supply apparatus as set forth in claim 13, wherein a delay time of said first delay buffer is predetermined so that said first and second switches are not simultaneously turned ON, when said pulse width modulation signal has a minimum ON-duty duration.

15. The power supply apparatus as set forth in claim 13, wherein said charge-pump type step-up circuit further comprises a third switch connected between a first power supply terminal for receiving said power supply voltage and said step-up capacitor,
said third switch being controlled by said clock signal.

16. The power supply apparatus as set forth in claim 11, wherein said stand-by operation is controlled by the inverted signal of said clock signal and a second AND logic signal between the inverted signal of said clock signal and said negative feedback control signal of the output voltage of said charge-pump type step-up circuit.

17. The power supply apparatus as set forth in claim 16, wherein said charge-pump type step-up circuit comprises fourth and fifth switches connected in series in a charging path between a first power supply terminal for receiving said power supply voltage and said step-up capacitor, and
wherein said step-up control circuit comprises:
a second AND circuit adapted to receive the inverted signal of said clock signal and said pulse width modulation signal to generate said second AND logic signal; and
a second delay buffer adapted to receive said second AND logic signal to generate a delayed signal of said second AND logic signal.

18. The power supply apparatus as set forth in claim 17, wherein a delay time of said second delay buffer is predetermined so that said fourth and fifth switches are not simultaneously turned ON, when said pulse width modulation signal has a minimum ON-duty duration.

19. The power supply apparatus as set forth in claim 17, wherein said charge-pump type step-up circuit further comprises a sixth switch connected between said step-up capacitor and a second power supply terminal,
said sixth switch being controlled by the inverted signal of said clock signal.

20. The power supply apparatus as set forth in claim 11, wherein said charge-pump type step-up circuit further comprises:
a fourth switch connected between a first power supply terminal for receiving said power supply voltage and said step-up capacitor; and a fifth switch connected between said step-up capacitor and a second power supply terminal, said fourth and second switches being controlled by the inverted signal of said clock signal.

21. The power supply apparatus as set forth in claim 11, wherein said pulse width modulation circuit comprises:

a voltage divider adapted to receive said output voltage to generate a divided voltage of said output voltage;

an error amplifier adapted to amplify a difference between said divided voltage and a reference voltage to generate an error voltage;

a dead time control voltage generating circuit adapted to generate a dead time control voltage for defining a minimum ON-duty duration;

a saw-tooth wave signal generating circuit adapted to receive said clock signal to generate a saw-tooth wave signal having a half period of said clock signal;

a first comparator adapted to compare said error voltage with said saw-tooth wave signal to generate a first comparison output signal;

a second comparator adapted to compare said dead time control voltage with said saw-tooth wave signal to generate a second comparison output signal; and an OR circuit adapted to receive said first and second comparison output signals to generate said pulse width modulation signal.

* * * * *